Aug. 12, 1952   B. B. JUNKUNC ET AL   2,606,613
CUTTING MACHINE

Filed March 15, 1948   5 Sheets-Sheet 2

INVENTORS
Bela B. Junkunc
& Walter Mazanek
BY Schneider & Dressler Attys.

Aug. 12, 1952  B. B. JUNKUNC ET AL  2,606,613
CUTTING MACHINE

Filed March 15, 1948  5 Sheets—Sheet 5

INVENTORS.
Bela B. Junkunc
& Walter Mazanek
BY Schneider & Dressler
Attys.

Patented Aug. 12, 1952

2,606,613

UNITED STATES PATENT OFFICE 2,606,613

CUTTING MACHINE

Bela B. Junkunc and Walter Mazanek, Chicago, Ill., assignors to Bela B. Junkunc, Alexander Junkunc, Sr., Alexander Junkunc, Jr., and Joseph G. Junkunc, a partnership doing business as J & J Tool & Machine Co., Chicago, Ill.

Application March 15, 1948, Serial No. 14,946

21 Claims. (Cl. 164—41)

This invention relates to a cutting machine particularly adapted to cut metal tubing or other formed or rolled sections having thin or fairly thin walls.

In cutting transversely through metal tubing or other formed or rolled sections by means of apparatus previously known, the edges of the metal adjacent the cut have almost invariably been deformed inwardly because of the pressure of the shear or cutting tool as it cut inwardly through the metal wall. This defect is particularly serious whenever straight edges are necessary, as in cases where members must be telescoped into the ends of the cut tubing, because of the time and labor required to straighten the edges after the cutting operation.

The present invention embodies means for securely holding or clamping metal tubing, of round, square, rectangular or cross sectional shape, on all sides, and then cutting it in the main substantially outwardly from the inside of the tubing. The tubing is first pierced by a lance which continues in a predetermined path of travel, lancing one edge of the tubing with a continuous outward thrust as it completes its travel. A cutting blade then enters the slot formed by the lance and severs the remaining sides of the tubing, cutting outwardly at every point of contact.

If the cutting machine is to be used to cut rolled or formed sections that are already provided with a slot, the lancing operation may be dispensed with and the cutting blade may be arranged so as to enter the section through the preformed slot.

The clamping jaws, lance, and cutting blade are operatively interconnected in such a manner that a single stroke of the handle will successively move the clamping jaws to closed position, move the lance through one edge of the tubing, and then move the cutting blade through the remaining walls of the tubing without deforming the edges of the tubing adjacent the cut.

The structure by which the above operations are attained will be described in the following specification, taken in conjunction with the accompanying drawings, in which.

Figure 15:
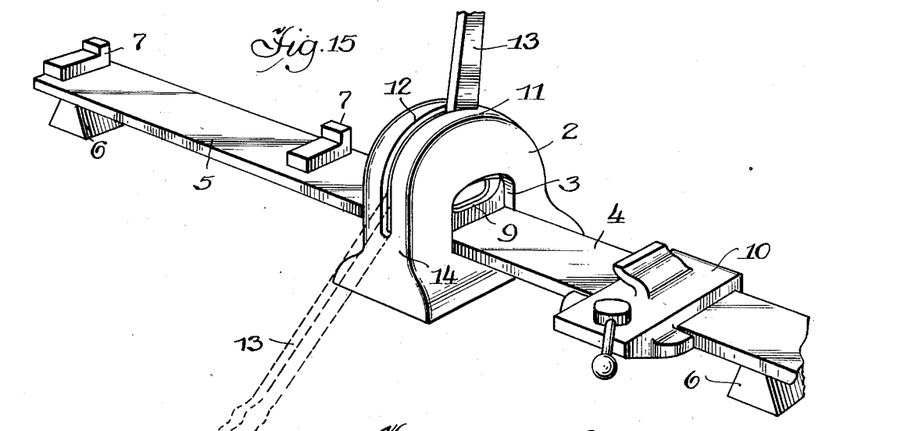
Fig. 15 is a fragmentary perspective view showing the cutting machine with its associated tubing supporting structure.

In the drawings, referring to Fig. 15, the cutting machine comprises a housing 2 having openings 3 on each side. Supporting shelves 4 and 5 each have one end supported by the bottom edge of one of the openings 3 and their outer ends supported on legs 6. Shelf 5 is provided with a plurality of L-shaped members 7 on its upper surface to form a support for the tubing 8 to hold it properly in alignment with the aperture 9 between the clamping jaws, hereinafter described. A side gage 10, mounted on shelf 4, is clamped into position to provide a stop against which the end of the tubing abuts to regulate the length of the pieces cut therefrom. The side gage may be of any suitable construction, the only requirement being that the gage be simple, easily adjusted to any position laterally of shelf 4, and that it will remain positioned after it has been properly set.

Shelf 4 may be provided with linear markings to show the precise distance of gage 10 from the clamping jaws. If desired, this shelf may be made integral with shelf 5 and the shelf may extend through a suitable opening in the housing.

Figures 5, 16, 17, 18:
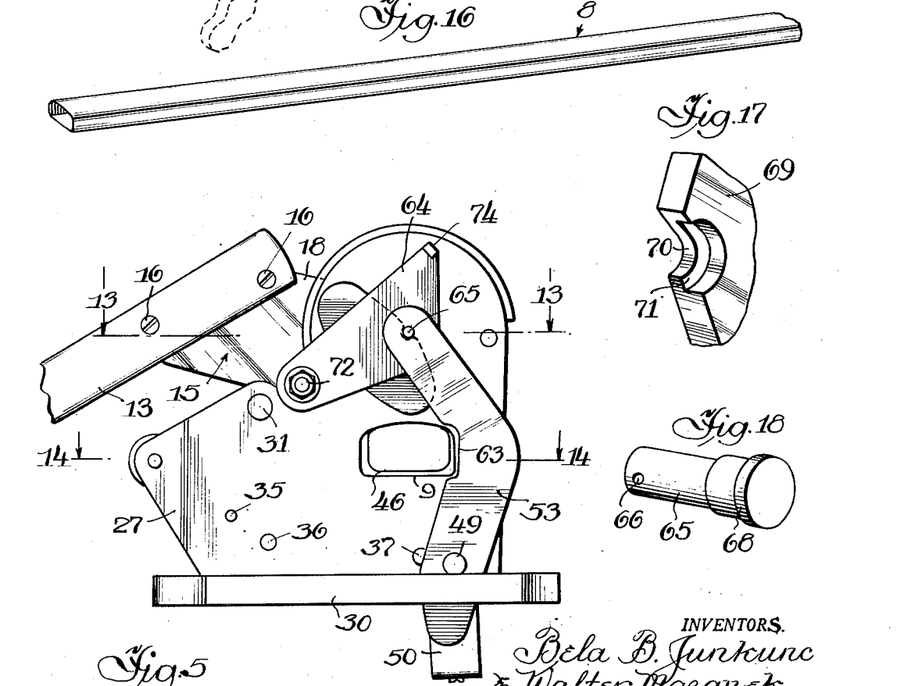
Fig. 5 is a side elevation of the cutting machine with the clamping jaws closed and the cutting blade in the position occupied by it after the cutting operation.
Fig. 16 is a fragmentary perspective view of the metal tubing with which the cutting machine is adapted to be used.
Fig. 17 is a fragmentary detail perspective view of the notched stop plate showing the undercut notch.
Fig. 18 is a detail perspective view of the pin which holds the lower end of the upper link and the upper end of the lower link together.

The top wall 11 of housing 2 has a vertical slot 12 through which a handle 13 projects. Slot 12 extends downwardly from the top a substantial distance through front wall 14 and also through the rear wall to provide sufficient clearance so that handle 13 may be moved through an arc great enough to permit complete severance of tubing 8. As shown in Fig. 5, handle 13 is secured to a cutting blade 15 by means of screws 16 which pass through apertures 17 in shank 18 of cutting blade 15. The lower end of handle 13 is preferably bifurcated to straddle shank 18.

Figure 13:
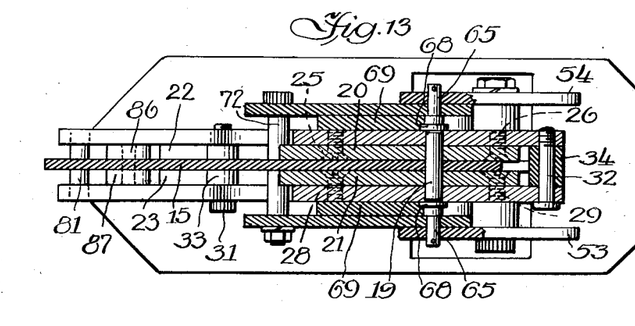
Fig. 13 is a cross sectional view taken substantially along the line 13—13 of Fig. 5.
Figure 14:
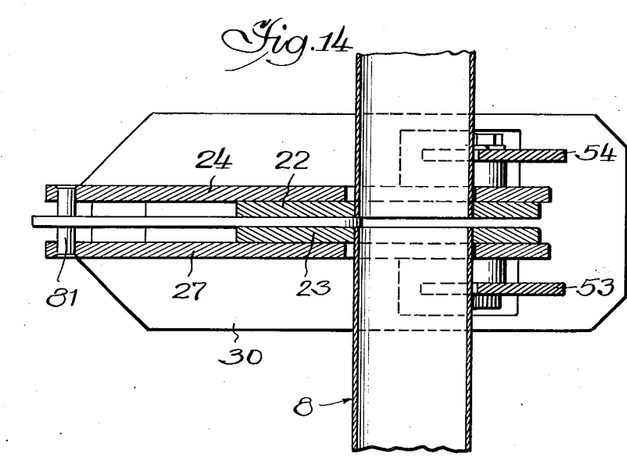
Fig. 14 is a cross sectional view taken substantially along the line 14—14 of Fig. 5.

Cutting blade 15 is pivotally secured, by means of a pin 19 (Fig. 13), between two upper fixed clamping jaws 20 and 21 which cooperate with lower movable clamping jaws 22 and 23 to hold tubing 8 while it is being cut. Jaws 20 and 21 are duplicates of each other and jaws 22 and 23 are also duplicates of each other. Each pair of jaws is spaced apart a distance substantially equal to the thickness of cutting blade 15 and one jaw of each pair is in the same vertical plane as the corresponding jaw of the other pair. Upper jaw 20 is secured to a side plate 24 by means of flat head screws 25 and 26. Upper jaw 21 is similarly secured to side plate 27, which is a duplicate of side plate 24, by means of flat head screws 28 and 29. The ends of pin 19 are fixed in apertures in side plates 24 and 27.

Side plates 24 and 27 are secured at their bottom edge to a base plate 30. Bolts 31 and 32 secure the upper edges of the side plates to each other. A spacer 33 encircling bolt 31 and a similar spacer 34 encircling bolt 32 keep the upper edges of the side plates spaced apart a distance equal to the combined thickness of cutting blade 15 and upper clamping jaws 20 and 21.

Lower movable clamping jaws 22 and 23 are pivotally secured between side plates 24 and 27 by means of a bolt 35. The lower edges of side plates 24 and 27 are additionally secured to each other by bolts 36 and 37 which pass through apertures 38 and 39, respectively, in lower clamping jaws 22 and 23. Spacers 40 and 41, encircling bolts 36 and 37, respectively, keep the lower edges of the side plate spaced apart the same distance as the upper edges. Apertures 38 and 39 are elongated slightly to permit the necessary pivotal movement of lower clamping jaws 22 and 23.

The upper edge 42 of each lower clamping jaw is shaped to fit the contour of the lower edge 43 of each upper jaw over a substantial portion of their meeting edges. At the portion in alignment with opening 3 in housing 2 the upper edges of the lower jaws and the lower edges of the upper jaws are cut away, as indicated at 44 and 45, respectively. When the jaws are closed cut away portions 44 and 45 cooperate to form openings 9 substantially equal in cross sectional area to the cross sectional area of tubing 8. Side plates 24 and 27 are also provided with openings 46 laterally aligned with openings 3 and 9. Opening 9, when the jaws are open, is slightly larger than the cross sectional area of tubing 8 so that the tubing may be freely slid through this opening.

Figures 1, 2:
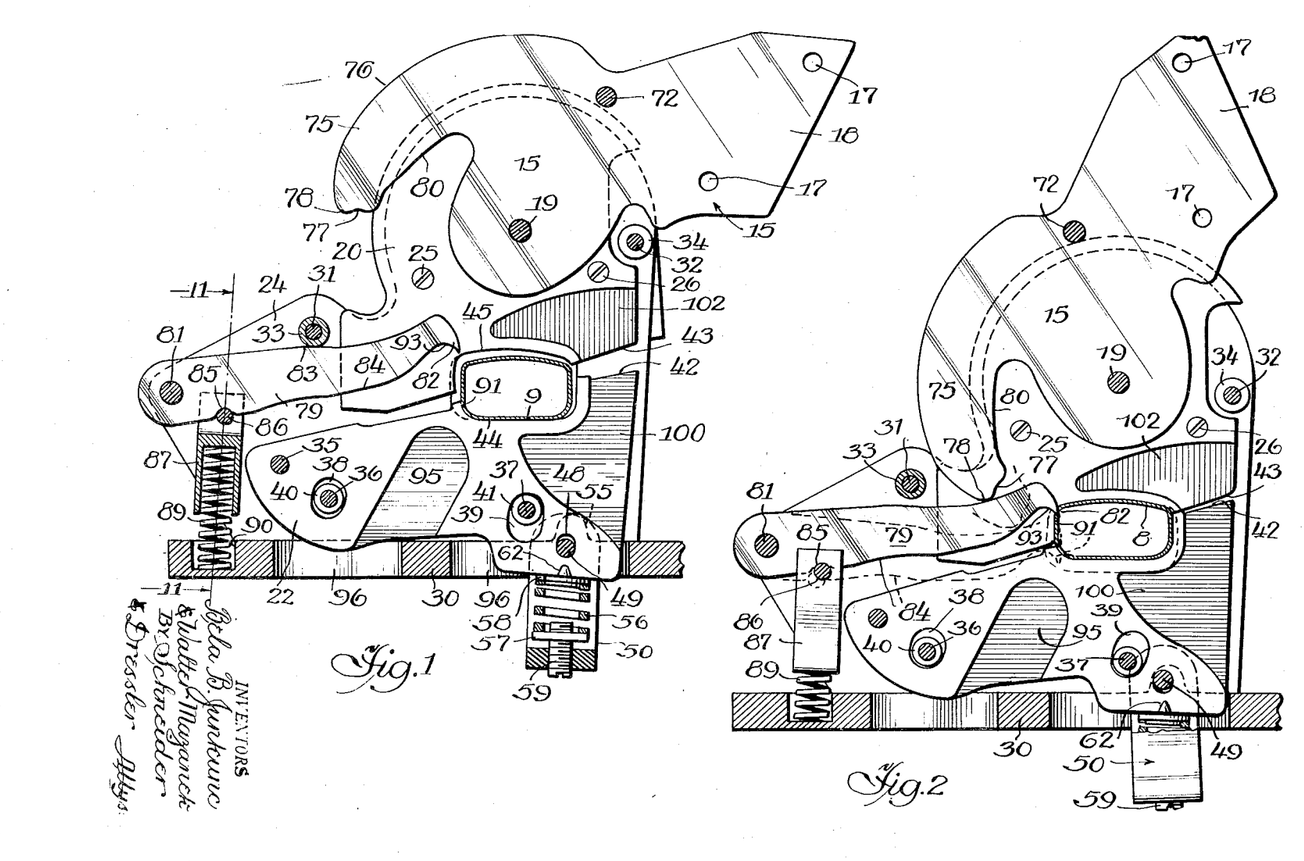
Figure 1 is a cross sectional view through the cutting machine with the clamping jaws in open position.
Fig. 2 is a view, similar to Fig. 1, with the clamping jaws closed and the lance in the position occupied by it at the time of the initial piercing operation, the path of travel of the lance being illustrated by a dotted outline showing the position of the lance at the finish of the lancing operation.
Figures 11, 12:
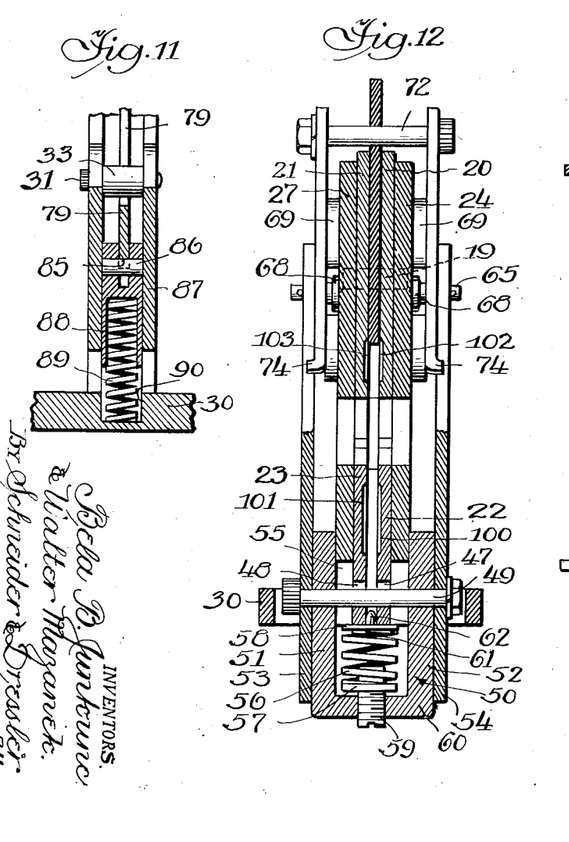
Fig. 11 is a cross sectional view taken along the line 11—11 of Fig. 1.
Fig. 12 is a cross sectional view taken substantially along the line 12—12 of Fig. 9.

The lower rear edge of lower clamping jaws 22 and 23 are apertured, as indicated at 47 and 48, Figs. 1 and 12, to receive a bolt 49. Apertures 47 and 48 are elongated slightly for a purpose hereinafter described. A yoke 50 has its upwardly extending sides 51 and 52 apertured to receive bolt 49 also. Bolt 49 also passes through the lower ends of links 53 and 54 which are positioned adjacent the outer surfaces of sides 51 and 52 of yoke 50. Side plates 24 and 27 are notched, as indicated at 55, to permit a limited upward movement of bolt 49.

The upward movement of bolt 49 is opposed by a heavy coiled compression spring 56 which is positioned between two washers 57 and 58. Washer 57 is threaded on a bolt 59 threaded through the bottom 60 of yoke 50. Bolt 59 projects upwardly through washer 57 and a portion of coiled spring 56. Washer 58 has a stub 61 projecting downwardly to enter the upper end of spring 56. A pin 62 projects upwardly from washer 58 and fits between the lower edges of jaws 22 and 23 to position the upper end of spring 56 beneath these jaws.

The linkage which controls the movement of jaws 22 and 23 is duplicated on both sides of the cutting machine, so only the linkage adjacent side plate 27 will be described. Link 53 extends upwardly along the outer surface of side plate 27 and is bent angularly, in its own vertical plane, to clear apertures 3, 9 and 46. The central portion of link 53, adjacent apertures 3, 9 and 46, is cut away, as indicated at 63, to provide clearance for tubing 8, which projects through these apertures, during the cutting operation. The upper end of link 53 is pivotally connected to another link 64, substantially at its central portion, by means of a pin 65, shown in detail in Fig. 18.

Figure 9:
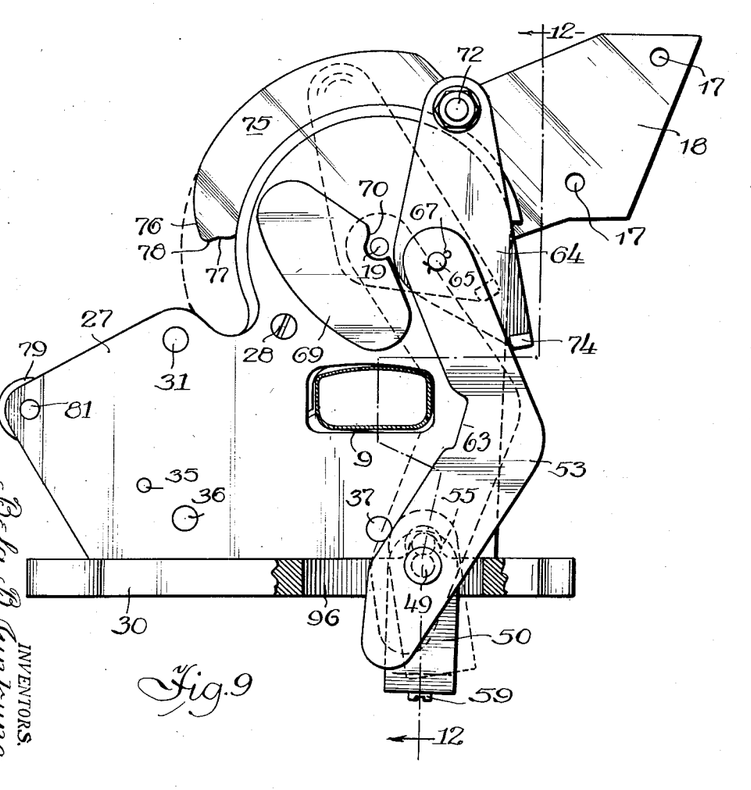
Fig. 9 is a side elevation of the cutting machine with the tubing clamped in position for the lancing and cutting operations, with the linkage shown in dotted lines in the position assumed by it just prior to the start of the lancing operation.
Figure 10:
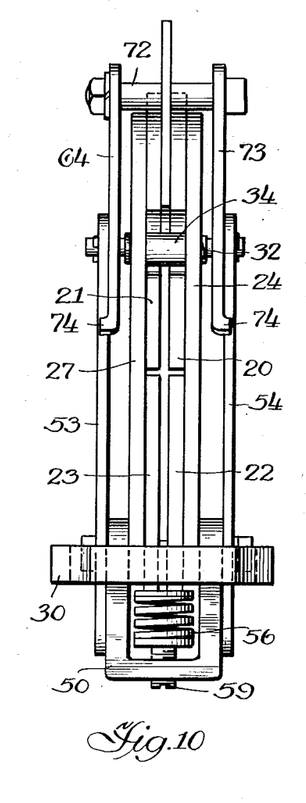
Fig. 10 is an end view of Fig. 9 looking to the left of Fig. 9.

The outer end of pin 65 is apertured, as shown at 66, to receive a cotter pin 67 (Fig. 9) to prevent separation of links 53 and 64. The inner end of pin 65 is provided with a circumferential flange 68. A stop member 69, secured to the outer surface of side wall 27, is provided with a notch 70 which is engaged by pin 65 just after the clamping jaws have been closed and before the lancing operation starts. The inner surface of stop member 69 is undercut adjacent notch 70, as indicated at 71 in Fig. 17, and flange 68 engages the undercut portion to aid in holding the parts together more securely during the lancing and cutting operations. The pin 19 which constitutes a fixed pivot for cutting blade 15 is positioned in axial alignment with notch 70 so that when pins 65 move into notch 70 both pins 65 and pin 19 are in one straight line.

Link 64 is pivotally secured at its upper end to cutting blade 15 by means of a bolt 72 which extends through cutting blade 15 and link 73 on the opposite side of the machine. Link 73 is a duplicate of link 64. The lower end of link 64 is bent at right angles to form an abutment 74 engaging the edge of link 53 to push it past its dead center and cause pin 65 to engage notch 70 as soon as the lower clamping jaws have been closed so that cutting blade 15 will function properly.

When tubing 8 is inserted through apertures 3, 9 and 46, lower jaws 22 and 23 are closed by rotational movement of handle 13 forwardly, or to the left as viewed in Figs. 1, 2, 5 and 9. Abutment 74, pressing against the outer edge of the upper half of link 53 causes links 53 and 64 to move as a unit about bolt 49 as a pivot. The same movement of handle 13 also rotates cutting blade 15 about its pivot 19. Rotational movement of links 53 and 64 about the pivot 49 lifts these links up to the dead center when bolt 72 is in direct vertical alignment with bolt 49. Since link 53 is connected to lower clamping jaws 22 and 23 by bolt 49, the lower clamping jaws are also raised with links 53 and 64.

The movement of lower clamping jaws 22 and 23 is about bolt 35 as a pivot and the distance the jaws move is such that upper edge 42 engages lower edge 43 of upper clamping jaws 20 and 21 just before links 53 and 64 reach dead center. Spring 56 exerts a constant force against washers 57 and 58, tending to force them apart, thereby keeping the lower edges of apertures 47 and 48 in contact with bolt 49 until lower clamping jaws 22 and 23 are closed. Continued rotation of handle 13 after the clamping jaws are closed raises links 53 and 64 against the action of spring 56. Yoke 50 and bolt 49 also move with link 53 until bolt 49 engages the upper edge of apertures 47 and 48. Notches 55 in side plates 24 and 27 are deep enough to provide sufficient clearance for this additional movement. As links 53 and 64 pass their dead center position pins 65 engage notches 70 in stop members 69, and since rotational movement of handle 13 no longer raises the links, spring 56 pulls the links downwardly to hold pins 65 against stop members 69 with flanges 68 seated in undercut portions 71 of notches 70.

When pins 65 engage stop members 69 rotational movement of the links 53 and 64 around pivot 49 is no longer possible and link 64 moves with cuting blade 15 about an axis formed by the coincidence of pin 19 and pins 65. This pivotal movement of link 64 causes abutment 74 to move away from the outer edge of link 53 until the cutting operation is completed and the parts are in the position shown in Fig. 5. Links 53 and 64 are made as separate members connected together by pin 65, instead of being made as a single link, so that blade 15 may be rotated about its pivot 19 after pin 65 engages notch 70.

The cutting portion of blade 15 comprises a finger-like projection 75 extending to the left and downwardly, as viewed in Fig. 1. This projection tapers somewhat towards the end so that the portion closest to the body of the blade is thicker than the free end. The upper edge 76, as viewed in Fig. 1, of projection 75, is substantially arcuate. The lower edge 80 is of slightly irregular contour so that as the edge 76 cuts through the bottom of tubing 8, edge 80 will cut through only a small portion of the top of the tubing. The end of projection 75 has a slight bulge 78 which engages the upper edge of lance 79.

Lance 79 is pivotally secured at one end between side walls 24 and 27 by means of a pin 81. It is positioned in the same vertical plane as cutting blade 15 between the vertical planes of the clamping jaws. The free edge of lance 79 terminates in a downwardly extending point 82 normally positioned over the forward edge of tubing 8 held by the clamping jaws. When lance 79 is in its normal position its upper edge 83 engages spacer 33 which prevents any upward movement past the normal position. Lower edge 84 of lance 79 has a shallow notch 85 engaged by a pin 86. Pin 86 is mounted in a housing 87 (Fig. 11) which has a downwardly extending open well 88. A coiled spring 89, having one end seated in well 88 and its other end in a recess 90 in base 30, urges lance 79 upwardly to move it back to its normal position after cutter blade 15 has been rotated out of the way.

When a piece of tubing 8 is to be cut it is inserted through apertures 3, 9 and 46 so that the portion to be cut is between clamping jaws 20 and 21 and 22 and 23. Handle 13 is rotated forwardly and cutter blades 15, moving around pivot 19, raises lower jaws 22 and 23 through the action of links 53 and 54 and 64 and 73. When the upper edges of lower jaws 22 and 23 engage the lower edges of upper fixed jaws 20 and 21, the upward movement of links 53 and 54 and 64 and 73 continues a short distance until bolt 49 reaches the upper edge of apertures 47 and 48 and spring 56 is compressed. Continued rotation of handle 13 causes pin 65 to move into notch 70 in stop member 69. In this position flange 68 is seated in undercut portion 71 and spring 56 exerts force urging pin 65 downwardly to hold it securely in notch 70. Further movement of links 53 and 54 and 64 and 73 in the same direction is impossible. Continued rotation of handle 13 moves cutting blade 15 and link 64 about pivot 19.

Figures 6, 7, 8:
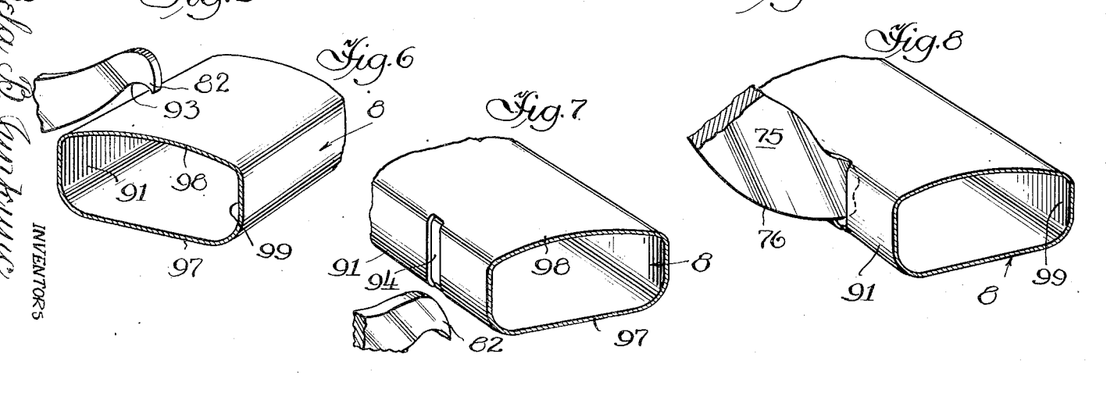
Fig. 6 is a fragmentary perspective view showing the lance and the tubing in their relative positions at the start of the lancing operation.
Fig. 7 is a view, similar to Fig. 6, showing the lance in the position occupied by it after the lancing operation has been completed.
Fig. 8 is a view, similar to Figs. 6 and 7, showing the cutting blade just after its initial entry into the tubing through the slot formed by the lancing operation.

When cutting blade 15 is rotated about pivot 19 after pin 65 engages stop member 69, bulge 78, which is part of end 77, engages the top edge 83 of lance 79 and forces point 82 to pierce the upper forward edge of tubing 8. This initial piercing operation is shown in Fig. 2. As cutting blade 15 continues rotating about pivot 19 its edge 78 forces lance 79 downwardly around pivot 81 until the front edge 91 of tubing 8 is lanced entirely across its surface as shown in Fig. 7. The lancing is done by the lowermost edge of lance 79 adjacent point 82. As may best be seen in Fig. 2, this portion of cutting edge 84 is curved upwardly, as indicated at 93, so that the entire lancing operation is accomplished with the edge 93 cutting outwardly against edge 91 of the tubing.

As shown clearly in Fig. 7, the lancing operation leaves a slot 94 entirely across wall 91 equal in width to the thickness of lance 79. Lower clamping jaws 22 and 23 are recesses, as indicated at 95 (Figs. 1, 2 and 12). The metal removed from tubing 8 to form slot 94 is pushed by edge 84 to the top of recesses 95. The total width of recesses 95 and the space between jaws 22 and 23 is sufficient so that the scrap from slot 94 falls through. Base 30 has a plurality of apertures 96 so that the scrap does not pile up on the base.

Figure 3:
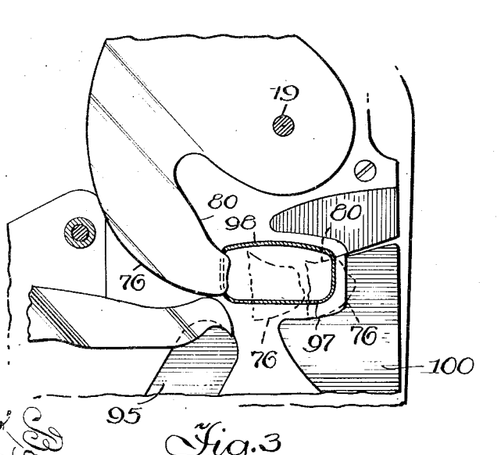
Fig. 3 is a fragmentary cross sectional view showing the cutting blade at the point of initial entry into the slot formed by the lancing operation.
Figure 4:
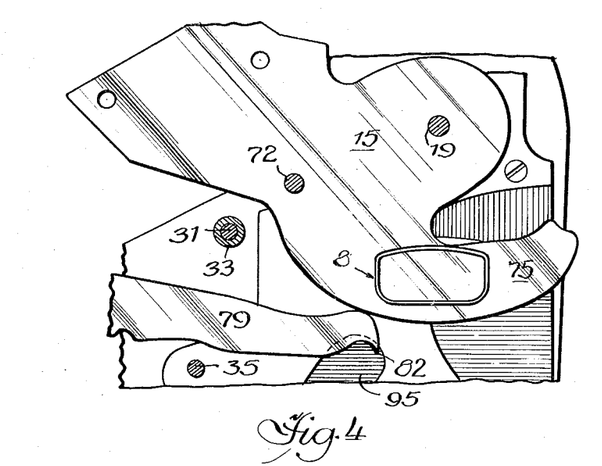
Fig. 4 is a view, similar to Fig. 3, showing the position of the cutting blade after the tubing has been completely severed.

After the lancing operation is completed, continued rotation of cutting blade 15 causes end 77, 78 to enter tubing 8 through slot 94. As shown in Fig. 3, edge 76 cuts outwardly from the interior of tubing 8, starting from the lower end of slot 94. Edge 80 also cuts outwardly from the interior of tubing 8, starting from the upper end of slot 94. As previously stated, the contour of edges 76 and 80 is such that edge 76 cuts entirely through bottom wall 97 while edge 80 cuts through only a small portion of upper wall 98.

When end 77, 78 reaches rear wall 99 of tubing 8 it cuts through with the same outward thrust used throughout the cutting operation. After wall 99 has been cut, edge 80, which is then moving substantially vertically, finishes cutting through upper wall 98 to completely sever the tubing. The clamping jaws hold tubing 8 on both sides of cutting blade 15 so close to the blade that the tube is not deformed outwardly during the lancing or cutting operation. The outward thrust of both lance and cutting blade eliminates any possibility of inward deformation of the tubing.

Lower jaws 22 and 23 are provided with recesses 100 and 101 (Fig. 12) to permit loose scrap from the cutting operation to fall through. Any scrap that is not previously ejected from the machine is ejected through recesses 102 and 103 in upper clamping jaws 20 and 21 upon completion of the cutting operation.

After the tubing has been completely severed, handle 13 is moved back to its initial position. This movement carries cutting blade 15 in a reverse direction around pivot 19 until dead center of links 53 and 54 and 64 and 73 is reached. Pins 65 are then disengaged from notches 70 and blade 15 is rotated about pivot 19 until its initial position is reached. The reverse movement about pivot 19 also moves lower clamping jaws 22 and 23 back to open position. As soon as projection 75 moves out of contact with lance 79, spring 89 moves lance 79 back to its initial position.

Although we have described a preferred embodiment of our invention in considerable detail, it will be understood that the description is intended to be illustrative, rather than restrictive, as many details may be modified or changed without departing from the spirit or scope of our invention. Accordingly, we do not desire to be restricted to the exact structure described, except as limited by the appended claims.

We claim:

1. In a cutting machine, a lance, a pivoted cutting blade and a handle secured thereto to facilitate pivotal movement thereof, said cutting blade being positioned above said lance in the plane thereof whereby it engages said lance during the first portion of its pivotal movement to push said lance through a portion of the object to be cut, said cutting blade engaging the object to be cut at the lanced portion thereof after said lancing operation to completely sever it.

2. In a cutting machine, a lance, a cutting blade positioned above said lance in the same plane, said blade engaging said lance upon actuation of said cutting blade to force said lance through a portion of the object to be cut before the cutting operation, said cutting blade engaging the object to be cut through said lanced portion and cutting the remaining portion of said object, and spring means for returning said lance to its initial position after return of said cutting blade to its initial position.

3. In a cutting machine, a lance, a spring holding said lance in predetermined position, a cutting blade and means for moving said cutting blade into direct engagement with said lance to move it from said predetermined position against the action of said spring to lance the object to be cut, said cutting blade moving said lance out of lancing position and engaging the lanced portion of the object to be cut to completely sever the object to be cut, said spring automatically returning said lance to said predetermined position after said cutting blade has been returned to its initial position.

4. In a cutting machine, a base, a pair of spaced side plates secured to said base, a lance pivoted at one end between said side plates, the free end of said lance terminating in a sharp point positioned adjacent an object to be cut, a spring having one end bearing against the lower edge of said lance intermediate its length and its other end bearing against said base, and a cutting blade pivoted between said side plates, said cutting blade engaging the upper edge of said lance to force said pointed end into the object to be cut upon pivotal movement of said cutting blade, continued pivotal movement of said cutting blade forcing said lance out of engagement with the object to be cut and moving said cutting blade into engagement with the object to completely sever it.

5. In a cutting machine, a base, a pair of spaced side plates secured to said base, a lance pivoted at one end between said side plates, the free end of said lance terminating in a sharp point positioned adjacent an object to be cut, a spring having one end bearing against the lower edge of said lance intermediate its length and its other end bearing against said base, and a cutting blade pivoted between said side plates, said cutting blade engaging the upper edge of said lance to force said pointed end into the object to be cut upon pivotal movement of said cutting blade, said cutting blade remaining in engagement with said lance upon continued pivotal movement of said blade to disengage said lance from said object and engaging said object at the lanced portion to cut therethrough upon continued pivotal movement of said blade after said lance is disengaged from said object.

6. In a cutting machine, a lance and a cutting blade, said lance being positioned in the path of travel of said cutting blade and directly actuated by said cutting blade to lance the object to be cut before said cutting blade engages said object, continued movement of said cutting blade being effective to completely sever the object.

7. In a machine for cutting metal tubing, a lance, a cutting blade directly engageable with said lance and movable to force said lance through one portion of said tubing and to move said lance out of engagement with said tubing, said cutting blade engageable with the interior of said tubing through said lanced portion after said lance has been moved out of engagement with said tubing and operable to sever the remaining portion of said tubing, the thrust of said blade against said tubing being in an outward direction at each successive point of contact.

8. In a machine for cutting metal tubing, a pair of side plates, a lance pivoted between said side plates, the free end of said lance terminating in a sharp point positioned adjacent a piece of tubing held in said machine, rotation of said lance causing said point to pierce said tubing, the edge of said lance adjacent said point being so shaped that continuation of rotation of said lance causes said edge to lance the edge of said tubing with a continuous outward thrust from said pierced opening, and a cutting blade pivoted between said side plates, said blade having a projection engaging said lance upon rotation of said blade and moving said lance pivotally until the lancing operation is completed, said projection then entering the slot made by said lancing operation upon continuation of the rotary movement of said blade, the edges of said projection thrusting outwardly against the remaining portion of the tubing to complete the cutting operation.

9. In a cutting machine, a lance, a pivoted cutting blade, a movable clamping jaw and a link connection comprising a pivotally connected pair of links, one of said links being connected adjacent one end to said movable jaw and said other link being connected adjacent its opposite end to said cutting blade, said link connection between said jaw and said blade causing said jaw to move to closed position upon pivotal movement of said cutting blade before the cutting operation, said lance being engaged by said blade and moved thereby through a portion of the object to be cut after said jaw has been moved to closed position and before said blade reaches cutting position, continued pivotal movement of said cutting blade being effective to completely sever the object to be cut.

10. In a cutting machine, a pair of side plates, a fixed clamping jaw, a second clamping jaw movable to cooperate with said fixed jaw to hold a tubular member, a lance mounted between said side plates, and a pivoted cutting blade mounted above said lance in proximity thereto and in vertical alignment therewith, whereby pivotal movement of said cutting blade actuates said lance to lance one portion of said tubular member, and means for moving one edge of said cutting blade into said lanced portion, continued pivotal movement of said cutting blade causing said blade to sever the unlanced portion of said tubular member.

11. In a cutting machine, a pair of side plates, a fixed clamping jaw, a second clamping jaw movable to cooperate with said fixed jaw to hold a tubular member, a lance mounted between said side plates, a pivoted cutting blade, a link connection between said cutting blade and said second clamping jaw, pivotal movement of said cutting blade successively moving said second clamping jaw to clamping position, actuating said lance by direct engagement therewith to lance one portion of said tubular member, moving part of said blade into said lanced portion of said tubular member, and completely severing said unlanced portion of said tubular member.

12. In a cutting machine, a pair of side plates, a pair of fixed clamping jaws mounted in spaced relation between said side plates, a pair of movable clamping jaws cooperating with said fixed jaws to hold an object to be cut, a lance and a cutting blade each pivoted separately in the space between the jaws of each pair of jaws, said cutting blade being positioned above said lance and in proximity thereto whereby pivotal movement of said cutting blade causes said blade to engage said lance and actuate it to lance said object to be cut before said blade engages said object to be cut, and a link connection between said blade and said movable jaws whereby pivotal movement of said blade moves said movable jaws to closed position before said blade actuates said lance, continued pivotal movement of said blade after it engages the object to be cut being effective to completely sever the object.

13. In a cutting machine, two pairs of spaced jaws operable to clamp an object to be cut therebetween, a lance and a cutting blade each pivoted to rotate in the plane between said spaced jaws, said blade in its pivotal movement engaging said lance to force said lance through a portion of said object to be cut and engageable, upon continued pivotal movement, with said lanced portion to completely sever said object.

14. In a cutting machine, two pairs of spaced jaws operable to clamp an object to be cut therebetween, a lance and a cutting blade each pivoted to rotate in the plane between said spaced jaws, said blade in its pivotal movement engaging said lance to force said lance through a portion of said object to be cut and engageable, upon continued pivotal movement, with the interior of said object through said lanced portion to completely sever said object by cutting outwardly from said interior.

15. In a cutting machine, a pair of side plates, a fixed clamping jaw, a movable clamping jaw cooperating with said fixed jaw to hold an object to be cut, a cutting blade pivoted between said side plates, a pair of links connected at one end by a pin, one of said links connected at its other end to said blade, said other link being connected at its other end to said movable jaw, said links being effective upon movement of said blade to move said movable jaw to closed position before said blade engages the object to be cut, and a stop plate engaging said pin after said movable jaw has been moved to closed position, said blade being pivotally movable into engagement with said object to be cut after said pin engages said stop plate.

16. In a cutting machine, a pair of side plates, a fixed clamping jaw, a movable clamping jaw cooperating with said fixed jaw to hold an object to be cut, a cutting blade pivoted between said side plates, a pair of links connected at one end by a pin, one of said links connected at its other end to said blade, said other link being connected at its other end to said movable jaw, said links being effective upon movement of said blade to move said movable jaw to closed position before said blade engages the object to be cut, and a stop plate provided with a notch having its inner edge undercut, a yoke secured to said movable jaw, a spring mounted in said yoke, said yoke being movable against said spring a short distance to permit a slight movement of said links after said movable jaw is closed, said pin having a flanged end engageable with said undercut portion of said notch, said spring exerting continuous force to hold said pin in said notch, said blade being movable about a different pivot when said pin is in engagement with said notch.

17. In a cutting machine, a rotatable cutting blade, a stationary clamping jaw, a movable clamping jaw, a pair of links, and a pin connecting said links together, one of said links being connected to said blade and the other link being connected to said movable jaw, said links being operable as a unit, upon rotation of said blade, to move said movable jaw into clamping relationship with said stationary jaw, and a stop member engaging said pin after said jaws are in clamping relationship to prevent further movement of both said links as a unit, said cutting blade being capable of further rotation after said stop member engages said pin.

18. In a cutting machine, a pair of side plates, a pair of fixed clamping jaws, a pair of movable clamping jaws cooperating with said fixed jaws to hold an object to be cut, the jaws of each pair being spaced from each other, a cutting blade pivoted between said fixed jaws, a pair of links positioned adjacent the outer surface of each of said side plates, the links of each pair being connected by separate pins, each of said pairs of links being movable as a unit, a bolt extending through the upper ends of each of said pairs of links, side plates, fixed clamping jaws and cutting blade to secure the upper ends of each of said pairs of links to said cutting blade, another bolt extending through the lower ends of each of said pairs of links and movable clamping jaws to connect the lower ends of each of said pairs of links to said movable clamping jaws, and a pair of stop members each secured to the outer surface of one of said side plates to engage said separate pins to limit the movement of said pairs of links as units.

19. In a cutting machine, a pair of side plates, a pair of fixed clamping jaws, a pair of movable clamping jaws cooperating with said fixed jaws to hold an object to be cut, the jaws of each pair being spaced from each other, a cutting blade pivoted between said fixed jaws, a pair of links positioned adjacent the outer surface of each of said side plates, the links of each pair being connected by separate pins, each of said pairs of links being movable as a unit, a bolt extending through the upper ends of each of said pairs of links, side plates, fixed clamping jaws and cutting blade to secure the upper ends of each of said pairs of links to said cutting blade, and another bolt extending through the lower ends of each of said pairs of links and movable clamping jaws to connect the lower ends of each of said pairs of links to said movable clamping jaws, the apertures in said movable clamping plates through which said second mentioned bolt extends being elongated slightly to permit a slight movement of said links as units after said movable clamping plates have been moved to closed position.

20. In a cutting machine, a pair of side plates, a pair of fixed clamping jaws, a pair of movable clamping jaws cooperating with said fixed jaws to hold an object to be cut, the jaws of each pair being spaced from each other, a cutting blade pivoted between said fixed jaws, a pair of links positioned adjacent the outer surface of each of said side plates, the links of each pair being connected by separate pins, each of said pairs of links being movable as a unit, each of said pins having a flanged end, the upper ends of said links being connected to said cutting blade, a bolt extending through apertures in the lower ends of each of said pairs of links and movable clamping jaws to connect the lower ends of each of said pairs of links to said movable clamping jaws, the apertures in said movable clamping jaws being elongated slightly to permit a slight movement of said links as units after said movable clamping plates reach their closed position, a pair of stop members each secured to the outer surface of one of said side plates, each of said stop members having an undercut notch to engage the flanged end of one of said pins, and a spring acting against said links to hold said flanged pins in said notches to prevent further movement of said links as units.

21. In a cutting machine, a lance, and a pivoted cutting blade, said cutting blade being positioned adjacent said lance and shaped so that a portion of its periphery engages said lance when said cutting blade is moved about its pivot, continued pivotal movement of said cutting blade forcing said lance through a portion of the object to be cut and subsequently forcing said cutting blade into the lanced portion and then through the remaining portion of said object to sever said object completely.

BELA B. JUNKUNC.
WALTER MAZANEK.

REFERENCES CITED

The following references are of record in the file of this patent:

UNITED STATES PATENTS

| Number | Name | Date |
|---|---|---|
| Re. 22,114 | Borzym | June 16, 1942 |
| 1,800,005 | Braun | Apr. 7, 1931 |
| 2,089,274 | Laukhuff | Aug. 10, 1937 |
| 2,234,999 | Yoder | Mar. 18, 1941 |
| 2,243,614 | Vogel | May 27, 1941 |
| 2,250,931 | Grieder | July 29, 1941 |
| 2,325,990 | Wales | Aug. 3, 1943 |